United States Patent Office 3,481,912
Patented Dec. 2, 1969

3,481,912
CROSS-LINKED POLYMERS OF VINYL HALIDES
AND VINYLIDENE HALIDES
Byron M. Vanderbilt, Westfield, and Roger S. Hawley, Cranford, N.J., assignors to Esso Research and Engineering Company, a corporation of Delaware
No Drawing. Filed Oct. 21, 1965, Ser. No. 500,316
Int. Cl. C08f 27/00, 29/18
U.S. Cl. 260—87.7                  14 Claims

ABSTRACT OF THE DISCLOSURE

A process for the crosslinking of saturated chain thermoplastic polymers containing vinyl halide or vinylidene halide repeat units in said saturated chain which comprises heating said polymer in contact with minor amounts of zinc oxide and a mononuclear quinone compound.

---

This invention relates to the crosslinking of thermoplastic polymers. More particularly, the present invention relates to the crosslinking of saturated chain thermoplastic polymers that contain vinyl or vinylidene halide repeat units.

Saturated chain polymers are thermoplastic in nature. They exhibit continuous flow under the influence of heat and pressure. Such polymers can be resoftened as often as desired and are usually soluble in selected solvents.

Crosslinkable or curable polymers, on the other hand, are generally thermosetting, that is to say that they cannot be softened without decomposition once they have cured or hardened, and are at least partially insoluble in all solvents. A chain polymer may, however, contain a small number of crosslinks without completely losing its thermoplastic character.

It is often desirable to crosslink or cure chain polymers This is done when it is desired to decrease solubility and thermoplastic flow and, in the case of chain elastomers, where it is desired to obtain a harder, tougher product. The crosslinking of unsaturated elastomers is commonly referred to as vulcanization.

Now, in accordance with the present invention, saturated chain polymers that contain at least about 0.5 wt. percent of halogenated vinyl or vinylidene-halide repeat units such as vinyl chloride, —$CH_2$–CHCl–, or vinylidene chloride, —$CH_2$–$CCl_2$–, units can be effectively crosslinked by mixing the chain polymer with minor amounts of zinc oxide and a mono-nuclear aromatic quinone compound as essential ingredients and other ingredients of the composition to form a blend, shaping the composition, and heating at an elevated temperature for a time sufficient for crosslinking to take place. As stated above, the chain polymer composition may be compounded with suitable stabilizers, plasticizers, and fillers prior to the crosslinking operation.

A wide variety of high molecular weight, substantially saturated chain polymers prepared by the polymerization of monomers containing at least about 0.5 wt. percent of vinyl halide or vinylidene halide repeat units, preferably vinyl and vinylidene chloride repeat units, may be cross-linked or cured according to the process of the present invention. In general, the polymers which are crosslinked or cured by this invention have molecular weights of at least 5000 and for the most part these polymers are solids; however, it is to be understood that high molecular weight liquid polymers may also be used. Representative non-limiting examples of polymers curable with the crosslinking system of the present invention include polyvinyl chloride, polyvinylidene chloride, vinyl chloride-vinylidene chloride copolymers, vinyl chloride-vinyl acetate copolymers, vinyl chloride-styrene copolymers, vinylidene chloride-vinyl acetate copolymers, vinylidene chloride-styrene copolymers, etc.

Representative mono-nuclear aromatic quinone compounds, that is, compounds having a single aromatic ring per molecule, which may be incorporated with the polymers according to the present invention include benzoquinone, hydroquinone, and their halogenated derivatives. Particularly useful halogenated compounds include tetrachlorobenzoquinone, trichlorohydroquinone, tetrabromobenzoquinone, etc. Zinc oxide is the only applicable metallic oxide useful in the curing system. Magnesium oxide, a compound which is normally associated with zinc oxide in many curing systems, tends to terminate the curing reaction with or without the presence of zinc oxide.

The quantity of quinone compound and zinc oxide used will depend upon the degree of cure desired and the reactivity of the polymer being crosslinked. In general, from 0.05 to 20 wt. percent zinc oxide based on polymer is required and preferably from 3 to 6 wt. percent of zinc oxide is used. Greater quantities may be used but the economics of such addition is unfavorable. The quantity of mono-nuclear aromatic quinone compound utilized varies from about 1 to 6% by weight of the polymer, preferably from about 2 to 4% by weight. Here again, the state of cure desired has a governing effect. The weight of the quinone compound used may be less, equal to, or more than the weight of the zinc oxide used.

The curing operation for crosslinking chain polymers containing vinyl halide or vinylidene halide repeat units is conducted by mixing the components of the curing system with the polymer along with any desired stabilizers, plasticizers or fillers and passing the mixture to a mold where the mixture is maintained at elevated temperature and pressure for a time sufficient to obtain a product having a relatively high crosslink density. Utilizing the curing system of the present invention, cure temperatures ranging from 250 to 400° F., preferably 290 to 390° F., can be used. The pressure at which the curing operation is conducted can vary over a wide range. Generally, compounds having relatively high crosslinked densities are obtained if the polymer is cured at mold pressures varying from about 100 to 3000 p.s.i.; however, mold or press pressures varying from 500 to 2000 p.s.i. are suitable. Cure times under the above conditions of temperature and pressure may vary from about 1 to 120 minutes; however, cure times varying from 10 to 60 minutes will be more common in commercial operations.

Any of a wide variety of plasticizers may be incorporated into the chain polymer prior to crosslinking with the curing system of the present invention. Particularly, good plasticizers are esters of dibasic carboxylic acids and alcohols of 8 to 18 carbon atoms. Suitable plastizers include tricresyl phosphate, triethyl phosphate, tri-iso octyl phthalate, octyl decyl phthalate, di-iso octyl adipate, dioctyl phthalate, dioctyl sebacate, etc. The amount of plasticizer used will depend upon the end use of the cured product. Generally, however, from 2 to 20 parts by weight of plasticizer per 100 parts of chain polymer can be used.

In addition to plasticizers, various types of carbon blacks, coke or mineral fillers may be incorporated into the chain polymer up to about 50 parts of filler per 100 parts of polymer. Among the carbon blacks that may be compounded with the chain polymer are the channel blacks such as EPC, MPC, HPC, etc. (these letters denoting carbon black products well known to the trade), the furnace blacks including SRF, HMF, etc. and the thermal blacks. The mineral fillers which may be used include any of the non-carbon black fillers or pigments such as the oxides, hydroxides, carbonates and so forth of silicon, aluminum, titanium, or the like, or silicates or aluminates of the various elements indicated.

Stabilizers for the chain polymer must be carefully chosen lest they interfere with the curing reaction. For example, when polyvinyl chloride is crosslinked with the curing system of the present invention, stabilizers of the tin-type have a very deleterious effect on the effectiveness of the curative combination. The lead phosphite stabilizer types have a less harmful effect, whereas the cadmium-barium types have little or no retarding effect on the curing reaction.

The following examples will better illustrate the nature of the present invention; however, the invention is not intended to be limited to these examples. Parts are by weight unless otherwise indicated.

EXAMPLE 1

To demonstrate the effectiveness of the curing system of the present invention, polyvinyl chloride having an inherent viscosity of 1.05 (ASTM-D-1243-60) was compounded and cured in the presence of various types of stabilizers with zinc oxide and tetrachlorobenzoquinone. The compounds were prepared by mixing all of the components on a two-roll mill using a stock temperature varying from 240 to 260° F. The compounds of Runs 2, 3 and 4, as is set forth in Table I below, were cured as flat pads in a 6" x 6" x 0.035" cavity mold at approximately 1200 p.s.i. The pads were heated for a period of 45 minutes at 300° F. The sample of Run 1 was prepared by pressing out a sheet of material at 350° F. and cooling the resulting pad while under pressure. Standard dumbbells were cut from each of the pads and tested for tensile strength at both room temperature and at 250° F. The results of the tests are set forth in Table I below.

TABLE I

| | Run | | | |
|---|---|---|---|---|
| | 1 | 2 | 3 | 4 |
| Polyvinyl chloride | 100 | 100 | 100 | 100 |
| Zinc Oxide | | 5 | 3 | 3 |
| Tetrachlorobenzoquinone | | 3 | 1 | 1 |
| Lead phosphite stabilizer [1] | 2 | 2 | 2 | |
| Bisphenol-A [2] | | | | 1 |
| Tensile strength (p.s.i.) (room temperature) | 9,050 | 9,895 | 9,520 | 9,685 |
| Tensile strength (p.s.i.) (250° F.) | 305 | 1,005 | 930 | 1,285 |

[1] A dibasic lead phosphite marketed under the trade name "Dyphos" by the National Lead Co.
[2] p,p'-isopropylidene diphenol.

The above tests indicate that the cured specimens of Runs 2, 3 and 4 have a slightly superior tensile strength to the uncured product of Run 1 at ordinary temperatures. However, at an elevated temperature, as exemplified by testing at 250° F., the zinc oxide-tetrachlorobenzoquinone cured compounds exhibited tensile strengths approximately 3 to 4 times greater than the uncured product. By comparing Runs 3 and 4, it can be seen that the lead phosphite stabilizer has an inhibiting effect on the curing reaction as compared to when the bisphenol-A stabilizer was used.

EXAMPLE 2

Six samples of polyvinyl chloride having an inherent viscosity of 1.05 (ASTM-D-1243-60) containing no stabilizers were compounded with zinc oxide and various types of mono-nuclear quinone compounds and stabilizers on a two-roll mill using a stock temperature varying from about 240 to 260° F. With the exception of the control (Run 5) all of the samples were cured as flat pads in a 6" x 6" x 0.035" cavity mold at approximately 1200 p.s.i., heating at 300° F. for 45 minutes. The control sample was merely pressed out into a comparable size sheet at 350° F. Standard dumbbells were cut from each of the pads and tested for tensile strength at both room temperature and at 250° F. Additionally, small portions of each of the pads were immersed in methyl ethyl ketone and toluene for a period of 24 hours to determine the resistance of the cured samples to solvent attack. The results of the test are set forth in Table II below.

TABLE II

| | Run | | | | | |
|---|---|---|---|---|---|---|
| | 5 | 6 | 7 | 8 | 9 | 10 |
| Polyvinyl chloride | 100 | 100 | 100 | 100 | 100 | 100 |
| Zinc oxide | | 5 | 5 | 5 | 10 | 5 |
| Tetrachlorobenzoquinone | | 3 | 3 | 3 | | |
| Tetrachlorohydroquinone | | | | | 6 | 10 |
| Organic tin stabilizer [1] | 3 | 3 | | | | |
| Bisphenol-A | | | 2 | | | |
| Cadmium-barium stabilizer [2] | | | | 3 | | |
| Tensile strength (p.s.i.)-rm. temp | 8,920 | (3) | 8,490 | 7,260 | 8,645 | 9,460 |
| Tensile strength (p.s.i.)-250° F | 370 | (3) | 1,075 | 1,195 | 940 | 1,127 |
| Wt. percent increase, immersion in methyl ethyl ketone, 24 hrs | (4) | (4) | 94 | 91 | 98 | 90 |
| Wt. percent increase, immersion in toluene, 24 hrs | 27 | | 2.7 | 2.1 | 1.9 | 1.1 |

[1] "Thermolyte-22" marketed by M&T Chemical Co.
[2] "Thermolyte-116" marketed by M&T Chemical Co.
[3] Pad Cracked.
[4] Disintegrated.

The data set forth above demonstrate the effectiveness of the curing system of the present invention. Runs 7, 8, 9 and 10 illustrate that the tensile strength of the cured product is approximately 3 times greater than the tensile strength of the uncured product (Run 5) at elevated temperatures. The solvent resistance study shows the relative solvent resistance properties of the cured samples. Methyl ethyl ketone is a good solvent for polyvinyl chloride and, as expected, the uncured polyvinyl chloride (Run 5) was largely dissolved by the solvent. In contrast, the data of Runs 7, 8, 9 and 10 show that a higher crosslink density was obtained with the curing system of the present invention as these samples were not dissolved by the methyl ethyl ketone solvent. Additionally, Run 6 shows that an organic tin stabilizer that is commonly used in conjunction with polyvinyl chloride strongly inhibits the curing of the polyvinyl chloride with the zinc oxide-tetrachlorobenzoquinone curing system. In contrast, the cured sample containing the cadmium-barium stabilizer (Run 8) exhibited acceptable high temperature and low temperature tensile properties and was relatively impervious to the action of solvents.

EXAMPLE 3

A series of tests were conducted to further illustrate the effectiveness of various components of the curing system of the present invention. In each of the tests, samples of polyvinyl chloride of Examples 1 and 2 were compounded with dioctyl phthalate, a cadmium-barium stabilizer, and the various components of the present curing system. Following the procedure of Example 2, cured pads were obtained which were tested both for tensile strength and solvent resistance. The results of the tests, as well as the cure time and cure duration, are recorded in Table III below.

TABLE III

| | Run | | | | | |
|---|---|---|---|---|---|---|
| | 11 | 12 | 13 | 14 | 15 | 16 |
| Polyvinyl chloride | 100 | 100 | 100 | 100 | 100 | 100 |
| Dioctyl phthalate | 5 | 5 | 5 | 5 | 15 | 15 |
| Cadmium-barium stabilizer | 2 | 2 | 2 | 2 | | |
| Zinc oxide | | | 5 | | 5 | 5 |
| Tetrachlorobenzoquinone | | | 3 | 3 | 3 | |
| Benzoquinone | | | | | | 3 |
| Tensile strength (p.s.i.), 250° F. Cure 307° F., 45 min | 205 | 250 | 170 | 475 | | |
| Wt. percent Increase, Immersion in Methyl Ethyl Ketone, 48 hrs. Cure 307° F., 45 min | (1) | (1) | (1) | 98 | | |
| Tensile strength (p.s.i.), 250° F. Cure 320° F., 45 min | (2) | 155 | 260 | 695 | | |
| Wt. percent Increase, Immersion in Methyl Ethyl Ketone, 48 hrs. Cure 320° F., 45 min | (1) | (1) | 126 | 61 | | |
| Wt. percent Increase, Immersion in Methyl Ethyl Ketone, 24 hrs. Cure 300° F., 45 min | | | | | 82 | 48 |

[1] Disintegrated.
[2] Pad cracked.

Runs 12, 13 and 14 demonstrate that either the zinc oxide or the halogenated mono-nuclear quinone compound, namely, tetrachlorobenzoquinone has some curing effect when used alone. However, Run 14 demonstrates that both components are necessary to achieve effective crosslinking. Runs 15 and 16 further demonstrate the use of various types of quinone compounds in conjunction with zinc oxide to obtain cured products that are relatively resistant to solvent degradation.

EXAMPLE 4

A further series of tests were conducted to demonstrate the utility of the present curing system for crosslinking polymeric blends consisting of polymers having either vinyl chloride or vinylidene chloride repeat units. In every test, the components of the polymer blend were dry mixed and further compounded on a two roll mill at a temperature of about 220–240° F. with dioctyl phthalate, a cadmium-barius stabilizer, and the various components of the present curing system. The blends were then press cured into pads with the use of a conventional cavity mold. Standard dumbbells were cut from each of the pads and tested for tensile strength and solvent resistance. The test results are set forth in Table IV below:

TABLE IV

| | Run | | | | | | | | |
|---|---|---|---|---|---|---|---|---|---|
| | 17 | 18 | 19 | 20 | 21 | 22 | 23 | 24 | 25 |
| Polyvinyl chloride [1] | 50 | 50 | 50 | 50 | 50 | 50 | 50 | 50 | 50 |
| Vinyl chloride-vinyl acetate copolymer [2] | 50 | 50 | 50 | 50 | 50 | | | | |
| Vinyl chloride-vinylidene chloride copolymer [3] | | | | | | 50 | 50 | 50 | 50 |
| Dioctyl phthalate | 5 | 5 | 5 | 5 | 5 | 5 | 5 | 5 | 5 |
| Cadmium-barium stabilizer | 2 | 2 | 2 | 2 | 2 | 2 | 2 | 2 | 2 |
| Zinc oxide | | | 0.1 | 0.1 | 0.5 | | | 0.5 | 0.5 |
| Tetrachlorobenzoquinone | | 3 | | 3 | 3 | | 3 | | 3 |
| Tensile strength (p.s.i.), 212° F. cure 300° F., 30 min | 75 | 70 | 90 | 415 | 470 | | | | |
| Wt. percent increase, immersion in methyl ethyl ketone, 24 hrs. cure 300° F., 30 min | (4) | (4) | | 204 | 97 | | | | |
| Tensile strength (p.s.), 212° F. cure 290°, F. 30 min | | | | | | 300 | 270 | 445 | 440 |
| Wt. percent increase, immersion in methyl ethyl ketone, 24 hrs. cure 290° F., 30 min | | | | | | 74 | 63 | 69 | 56 |

[1] General purpose PVC having an inherent viscosity of 1.05 by ASTM D–1243–60 (Method A).
[2] Copolymer of about 85% vinyl chloride and 15% vinyl acetate having an inherent viscosity of 0.58 by ASTM D–1243–60 (Method A).
[3] Copolymer of about 80% vinylidene chloride and 20% vinyl chloride containing approximately 10 wt. % phenyl ether plasticizer having a solution viscosity in o-dichlorobenzene at 120° C. by Dow test BS-SB of 1.12–1.20 cps and a relative viscosity in a 1% solution of cyclohexanone at 25° C. of 1.55.
[4] Disintegrated.

Runs 20 and 21 illustrate that a marked improvement in tensile and solvent resistance properties is secured with blends of polyvinyl chloride with a vinyl acetate copolymer that are crosslinked with the curing system of this invention. Similarly, Run 25 demonstrates that the best combination of tensile and solvent resistance properties is obtained with blends of polyvinyl chloride with a vinylidene chloride copolymer when the blend is cured with the ZnO-quinone system of this invention.

The curing system of the present invention serves to crosslink chain polymers that contain at least 0.5 wt. percent of either a vinyl halide or vinylidene halide repeat unit. The cured products so formed have many varied uses. For example, a relatively inexpensive polymer such as polyvinyl chloride can be molded and subsequently crosslinked into pipe which will exhibit high burst strengths even when carrying materials at elevated temperatures.

While there are above described number of specific embodiments of the present invention, it is obviously possible to produce other embodiments of various equivalent modifications and variations thereof without departing from the spirit and scope of the invention. Having now set forth the general nature and specific embodiments of the present invention, the true scope is now particularly pointed out in the appended claims.

What is claimed is:

1. A method for curing chain polymers having a structure containing at least 0.5 wt. percent repeat units selected from the group consisting of

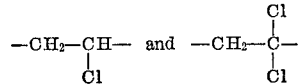

comprising heating said polymer in contact with minor amounts of zinc oxide and a mono-nuclear aromatic quinone compound for a time sufficient to obtain a cured product.

2. The method of claim 1 wherein said polymer is polyvinyl chloride.

3. The method of claim 1 wherein said polymer is polyvinylidene chloride.

4. The method of claim 1 wherein said polymer is a copolymer of vinyl chloride and vinylidene chloride.

5. The method of claim 1 wherein said quinone compound is benzoquinone.

6. The method of claim 1 wherein said quinone compound is tetrachlorobenzoquinone.

7. The method of claim 1 wherein said quinone compound is tetrachlorohydroquinone.

8. A method for curing chain polymers having a structure containing at least 0.5 wt. percent repeat units selected from the group consisting of

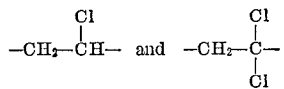

comprising heating said polymer in contact with minor amounts of zinc oxide and a mono-nuclear aromatic quinone compound selected from the group consisting of benzoquinone, hydroquinone, and their halogenated derivatives for a time sufficient to obtain a cured product.

9. The method of claim 8 wherein said halogenated derivatives are chlorinated derivatives.

10. A method for curing chain polymers having a structure containing at least about 0.5 wt. percent repeat units selected from the group consisting of —CH$_2$—CHCl— and —CH$_2$—CCl$_2$— comprising heating said polymer in contact with from 0.05 to 20% by weight based on polymer of zinc oxide and from 1 to 6 wt. percent based on polymer of a mono-nuclear aromatic quinone compound and a temperature in the range of from about 250 to about 450° F. for a time sufficient to obtain a cured product.

11. The method of claim 10 wherein said polymer is heated in the presence of zinc oxide and said mono-nuclear aromatic quinone compound from about 1 to about 120 minutes.

12. The method of claim 11 wherein said chain polymer is polyvinyl chloride.

13. The method of claim 12 wherein said mono-nuclear aromatic quinone compound is selected from the group consisting of benzoquinone, hydroquinone and their chlorinated derivatives.

14. The method of claim 13 wherein said polyvinyl chloride is heated in contact with from 3 to 6% by weight based on polymer of zinc oxide and from 2 to 4% by weight based on polymer of said mono-nuclear aromatic quinone compound.

References Cited
UNITED STATES PATENTS 2,157,997  5/1939  Brous.
2,427,071  9/1947  Reuter.

JOSEPH L. SCHOFER, Primary Examiner

J. A. DONAHUE, JR., Assistant Examiner

U.S. Cl. X.R.

260—87.1, 87.5, 91.7, 92.8